Figure 1:
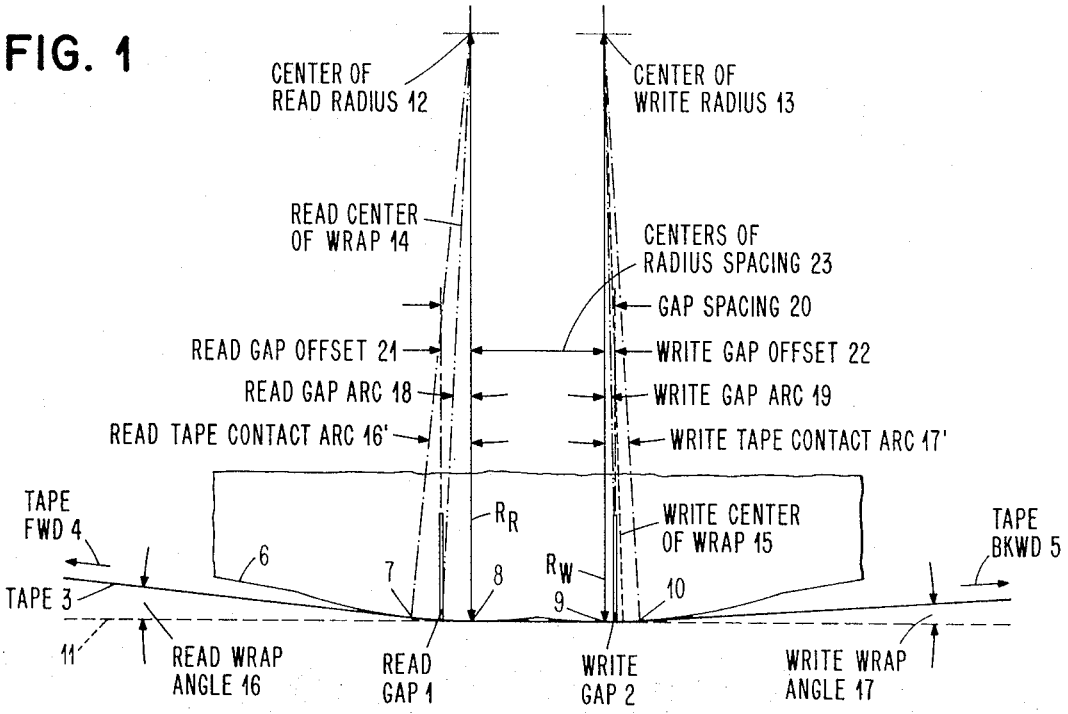
Figure 2:
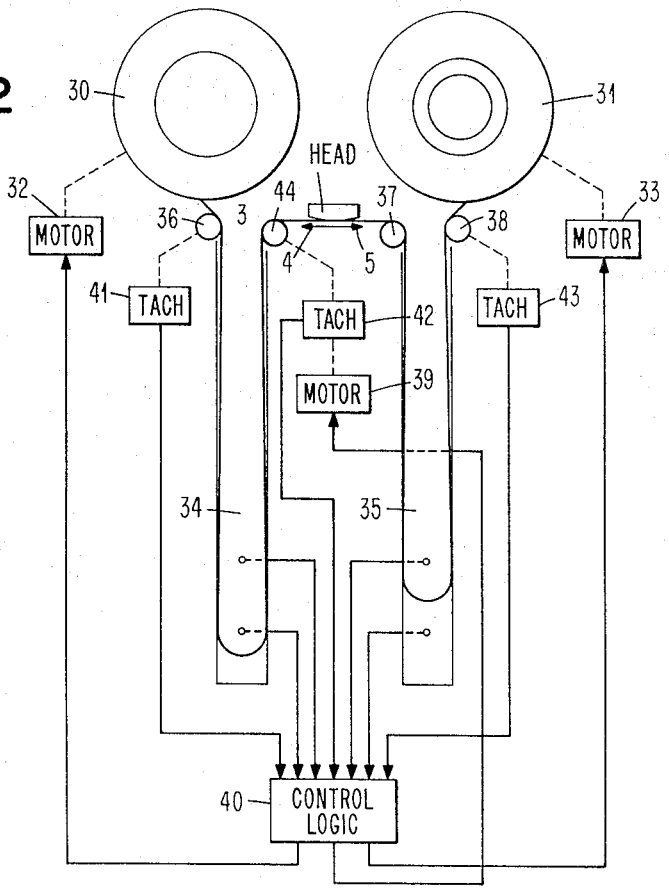

DEFENSIVE PUBLICATION

UNITED STATES PATENT OFFICE

Published at the request of the applicant or owner in accordance with the Notice of Dec. 16, 1969, 869 O.G. 687. The abstracts of Defensive Publication applications are identified by distinctly numbered series and are arranged chronologically. The heading of each abstract indicates the number of pages of specification, including claims and sheets of drawings contained in the application as originally filed. The files of these applications are available to the public for inspection and reproduction may be purchased for 30 cents a sheet.

Defensive Publication applications have not been examined as to the merits of alleged invention. The Patent Office makes no assertion as to the novelty of the disclosed subject matter.

PUBLISHED OCTOBER 30, 1973

915 O.G. 1570

T915,016

BIDIRECTIONAL MAGNETIC HEAD

Tseng K. Chow and Arthur B. Wills, Boulder, Colo., assignors to International Business Machines Corporation, Armonk, N.Y.

Continuation of abandoned application Ser. No. 179,866, Sept. 13, 1971. This application Apr. 26, 1973, Ser. No. 354,718

**Int. Cl. G11b *5/26***

U.S. Cl. 340—174.1 F

1 Sheet Drawing. 10 Pages Specification

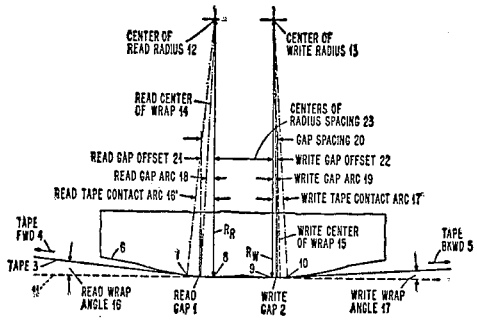

A magnetic head surface contour is defined by two constant radii. The two pairs of points at which a magnetic tape is tangent to the two contours locate two centers-of-wrap at the midpoints of tangency. The tape path is controlled to give two different tape wrap angles relative to the horizontal. A read gap, used during both forward and backward tape motion is located at but not precisely on, one of the centers-of-wrap. A write gap, used during write operations, is located downstream (during forward tape motion) from the other center-of-wrap.

BIDIRECTIONAL MAGNETIC HEAD

Original Filed Sept. 13, 1971